April 26, 1966  B. L. BLEDSOE  3,248,139
TWINE SPRING FOR KNOTTER
Filed Dec. 6, 1963  2 Sheets-Sheet 1
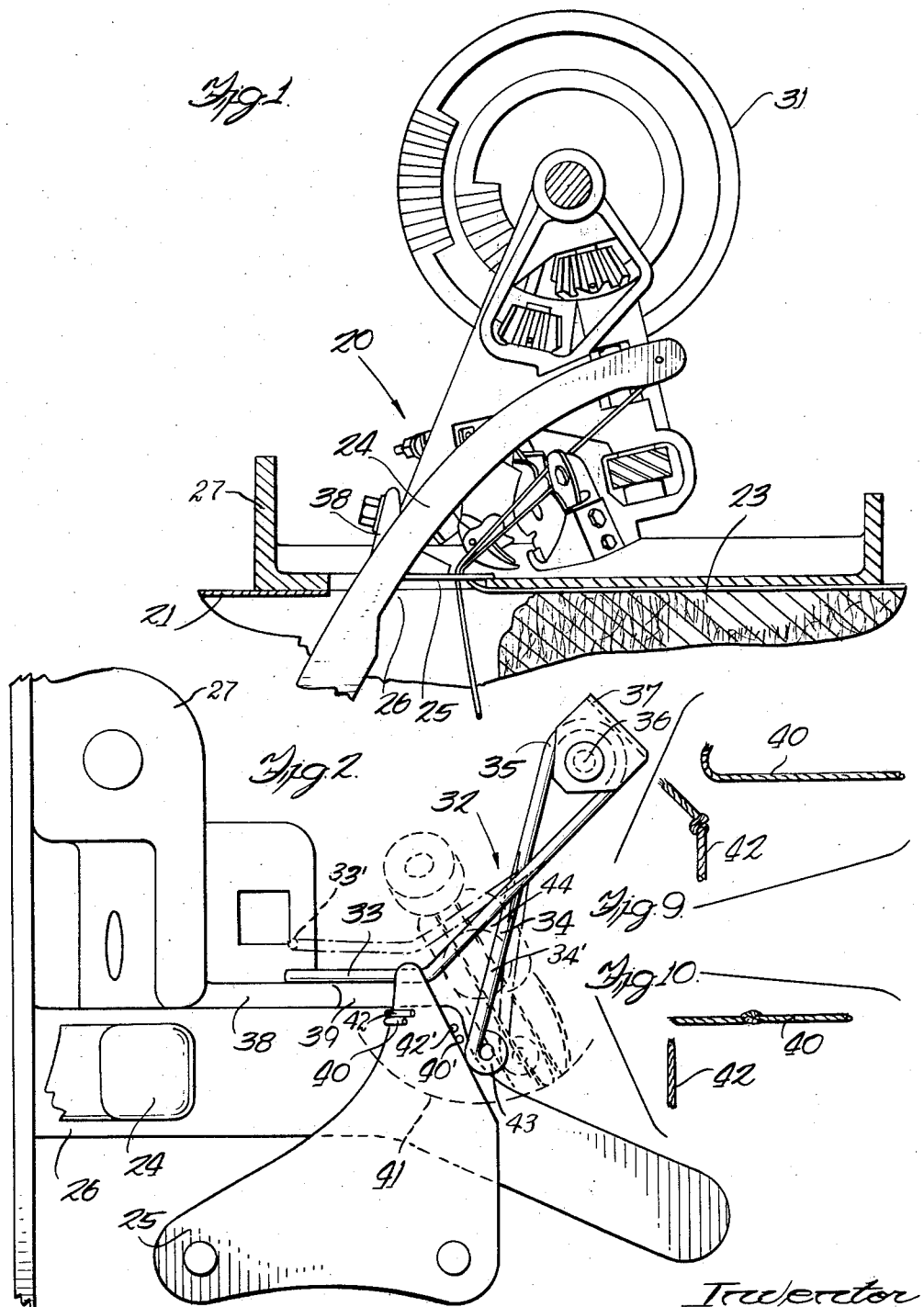
Inventor
Bobby Lyerr Bledsoe
Ralph Alvey
Attorney

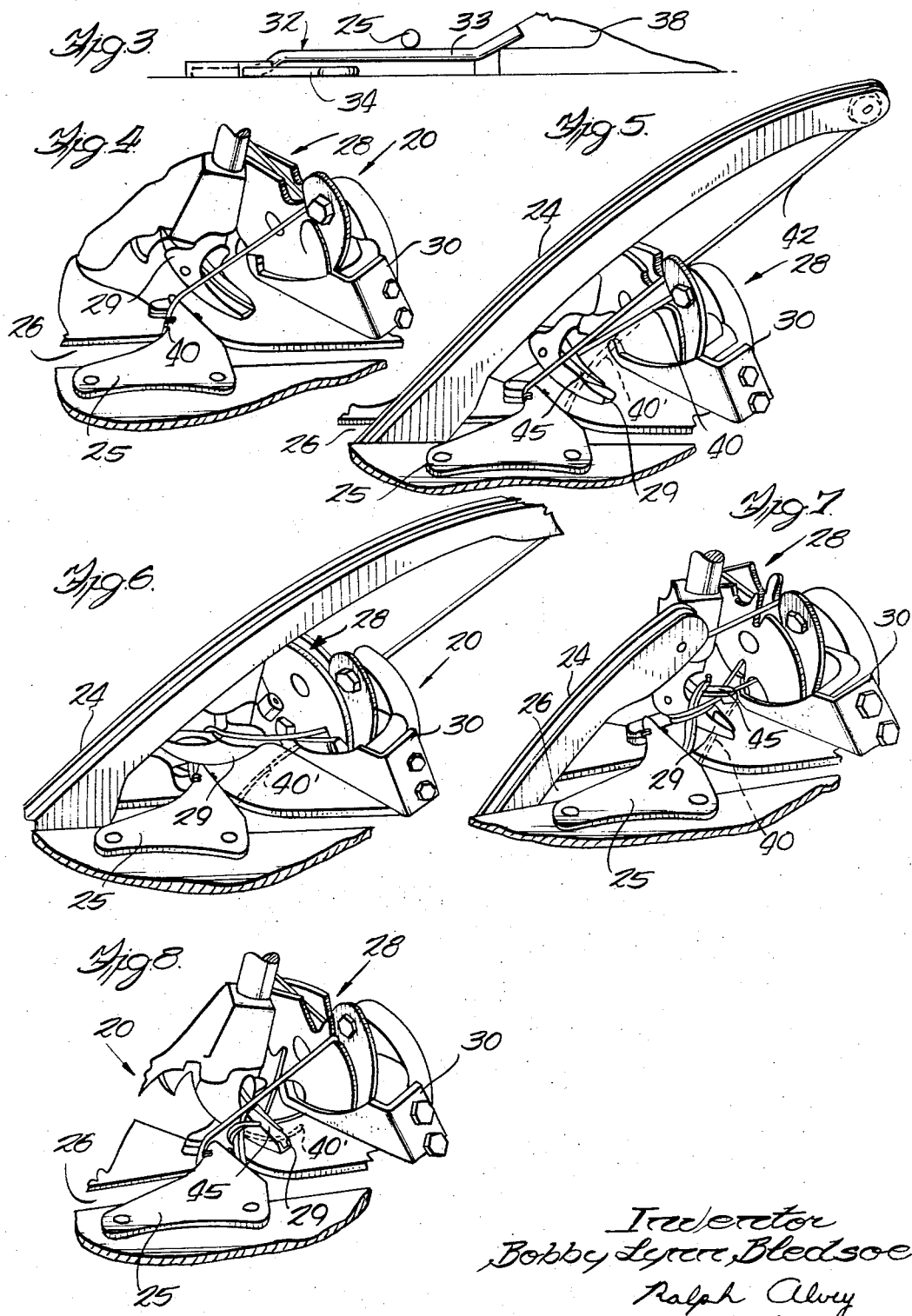

United States Patent Office 3,248,139
Patented Apr. 26, 1966

3,248,139
TWINE SPRING FOR KNOTTER
Bobby Lynn Bledsoe, Memphis, Tenn., assignor to International Harvester Company, Chicago, Ill., a corporation of New Jersey
Filed Dec. 6, 1963, Ser. No. 328,545
3 Claims. (Cl. 289—15)

This invention is a new and useful improvement of the twine tying mechanism of a hay baler. More particularly, the improvement comprises a twin pocket and retaining spring for preventing the premature removal of the baling twine from the breast plate finger and for properly positioning the baling twine on the knotter bill hook.

In general, therefore, the object of this invention is to increase the efficiency of the hay baling operation by reducing the number of imperfect knots made by the knotter, imperfect knots being undesirable because they permit the bales of hay to become unbound. In particular, the objects of the present invention are First: to increase assurance of knot formation during each tying cycle by preventing the baling twine from prematurely moving from the breast plate finger and out of reach of the knotter bill hook;

Second: to further guarantee the formation of a knot during each tying cycle by retaining the baling twine on the bill hook in such a position that the jaw beak can grip the twine.

The novel twine pocket and retaining spring with which these objectives are attained is shown in the drawings, where:

FIG. 1 shows the general location of the novel spring with respect to the other elements of the knotter mechanism;

FIG. 2 is a plan view taken on plane 2—2 in FIG. 1 showing the structural details of the novel spring;

FIG. 3 is an elevation taken on plane 3—3 of FIG. 2 showing other details of the novel spring;

FIGS. 4 through 6 show how the twine retainer section of the novel spring acts to retain the twine on the breast plate finger during the bale-formation stage of the baling cycle;

FIGS. 7 and 8 show how the twine pocket section of the novel spring acts to position the twine on the bill hook during the knot tying stage of the baling cycle;

FIG. 9 shows the type of incomplete knot that results when the twine over the bale gets past the breast plate finger before the tying cycle starts; and FIG. 10 shows the type of incomplete knot that results when the jaw of the bill hook misses the needle twine.

Two factors that prevent the tying cycle of a hay baler from being 100 percent efficient are (1) the tendency of the bale end of the twine to slip off the breast plate finger during the bale forming stage, and (2) the tendency of the twine to shift to the outer end of the bill hook during the knot tying stage. In the first case, it is essential that the bale end of the twine stay on the breast plate finger unil the needle end of the twine is also on the breast plate finger, since the ends of the strand of twine looping a bale of hay must be manipulated together to form a knot. In the second case, if the twine is allowed to shift to the outer section of the bill hook, the bill hook is unable to close on both strands of twine, so that an incomplete knot is formed. Whether one or the other of these mishaps occurs, the effect is the same. When the bale of hay is discharged, the twine around the bale comes loose, and the hay is scattered about the field.

The present invention overcomes these two problems by providing a two-legged spring 32, one leg of which holds the bale end of the twine on the breast plate finger during the bale forming stage and the second leg of which properly positions the twine on the bill hook during the knot tying stage. The general location of this novel spring with respect to the twine tying mechanism of a hay baler is shown in FIGS. 1 and 2.

The twine tying mechanism of FIG. 1 comprises a knotter 20 located on top of the bale-forming chamber 21 of a hay baler. A plunger (not shown) reciprocates in chamber 21 to compact bales of hay, such as bale 23. Needle arm 24 oscillates through slot 26 in the top of chamber 21 to deliver twine to the cord holder mechanism 28. A cantilevered breast plate finger 25 is attached to the top of bale chamber 21 to support the twine delivered by needle arm 24 to the knotter 20. The novel twine pocket and retaining spring comprising the present invention is shown at 32 on top of chamber 21 adjacent breast plate finger 25.

The knotter mechanism shown in FIG. 1 comprises, in turn, a rotary twin disc cord holder 28 for gripping the twine during the bale-forming and knot-tying stages, a rotary bill hook 29 for forming the knot, a twine knife 30 for cutting the twine to separate the bale of hay from the twine supply, and a drive mechanism 31 for driving the knotter assembly. Since the knotter 20 per se forms no part of the present invention, the reader is referred for a further description thereof to U.S. Patent No. 3,101,963.

As shown in FIGS. 2 and 3, the novel twine pocket and retaining spring 32 comprises a length of spring wire shaped to resemble in general the lower case Greek letter alpha ($\alpha$). A twine retainer portion 33, a twine pocket portion 34, and a central, bight portion 35 form the spring. Screw 36 and clip 37 fasten spring 32 to the top surface of baling chamber 21.

Twine retainer portion 33 of spring 32 extends parallel to the top surface of the baling chamber (see FIG. 3) and passes under the tip of cantilever breast plate finger 25. The end of retainer portion 33 bends upward and presses against bracket 38 of base plate 27, to close off the opening 39 between breast plate 25 and bracket 38 to retain twine on breast plate finger 25. Twine retainer portion 33 of spring 32 could, however, just as well pass over the top or press against the tip of breast plate finger 25 in order to perform its retaining function. Twine end 40 of the twine bears against breast plate finger 25 during the bale forming stage at a point within the circle 41 traced by bill hook 29 when it rotates to form a knot. Retainer portion 33 prevents twine end 40 from slipping off of breast plate finger 25 until needle end 42 of the twine is delivered to the cord holder 28 by needle 24, to complete the loop of twine around the bale. When bill hook 29 rotates clockwise to start forming a knot in twine ends 40 and 42, bill hook 29 sweeps the twine ends off of the upstream side of breast plate finger 25, flexes retainer portion 33 to position 23', and carries the twine past retainer portion 33 to the positions 40' and 42' (FIG. 2) downstream of breast plate finger 25. If twine end 40 of the twine were to slip off the breast plate finger to position 40' (FIG. 4) before bill hook 29 rotates, bill hook 29 would miss twine end 40 and form an incomplete knot as shown in FIG. 9.

Twine pocket portion 34 of spring 32 forms a triangular twine pocket 44 on the downstream side of cantilever breast plate finger 25, the other two sides being the breast plate finger 25 and twine retainer portion 33 of spring 32. As shown in FIG. 3, twine pocket portion 34 lies substantially flat against the top surface of the baling chamber and presses against breast plate finger 25 (see FIG. 2). The end of the pocket portion 34 is bent into a loop 43 to facilitate a positive seating of pocket portion 34 against breast plate finger 25 regardless of manufacturing errors or wear of portion 34 from use. Twine pocket portion 34 holds twine strands close to the axis of rotation of bill hook 29, so that the twine strands will pass under the jaw 45 of the bill hook 29 (see FIG. 7). If twine pocket portion 34 were not present, the twine strands would be free to move outward toward the circle of rotation 41 of bill hook 29, to a point substantially out of reach of jaw 45 of bill hook 29. As a consequence, when the jaw 45 closed, the strands would not be gripped by jaw 45, resulting in an incomplete figure "8" knot, as shown in FIG. 10. When the knot is stripped from the bill hook 29, the twine strands 40' and 42' force the pocket portion 34 of spring 32 to the dotted line position 34', thereby allowing the twine strands to move out of the pocket 44.

The operation of the novel twine pocket and retaining spring 32 is shown in FIGS. 4 through 8. FIGS. 4 through 6 show the operation of the twine retainer portion 33; while FIGS. 7 and 8 show the operation of the twine pocket portion 34.

At the start of a bale-forming stage (FIG. 4), needle 24 has lain twine across bill hook 29 and down behind breast plate finger 25, forming the bale end 40 of the twine. At the end of the bale-forming stage (FIG. 5), needle 24 delivers the needle end of the twine to cord holder 28 to complete the loop of twine around the bale.

During the interval between FIG. 4 and FIG. 5, the impacts caused by the plunger forcing hay against twine 40 are apt to cause the twine 40 to slip off of breast plate finger 25. (A loose or worn breast plate finger or movement of the baler over rough terrain might also cause this trouble.) When the twine 40 slips off of the breast plate finger 25, it moves under bill hook 29 to assume the position shown at 40'. Consequently, when bill hook 29 rotates to form a knot (FIG. 6), the twine 40 is not included in the knot, so that a knot is formed in only the needle twine 42 (see FIG. 9). By using the twine pocket and retaining spring 32 described herein, however, the bale end of the twine is prevented from prematurely slipping off of the breast plate finger 25, so that both the bale end 40 and the needle end 42 of the twine are included in the knot, as shown in solid lines in FIG. 6.

When the twine is moved off of the back of breast plate finger 25 by the bill hook 29 (FIG. 6) to the downstream side of the breast plate finger (FIG. 7), it is essential to keep the twine from moving too far out on the tip of the bill hook. The twine strands 40 and 42 must be close enough to the axis of bill hook 29 so that jaw 45 may close on the twine (FIG. 7). If the twine 40 and 42 should move too close to the tip of bill hook 29, for example, to 40' in FIGS. 7–8 because of a misaligned cord holder or because of jolts caused by movement of the baler over rough terrain, the jaw 45 could miss twine strands 40 or 42 and an imperfect knot could result, as shown in FIG. 10, where a knot is made in only the bale end 40 of the twine.

In the foregoing specification, a new and useful twine pocket and retaining spring for a twine knotter has been presented. Although only one physical form has been described, it is nevertheless intended that the attached claims cover all such other obvious forms that fall within their spirit and scope.

The invention claimed is:

1. A twine-tying mechanism for a hay baler, comprising: a housing member, a twine needle slot in said housing member, said needle slot having an upstream section for passage of twine needle and a downstream section for withdrawal of twine, a breast plate finger on said baler and cantilevered over said needle slot for supporting twine during the initial stages of the bale tying cycle, a rotary knotter bill hook on said baler adjacent the downstream side of said breast plate finger, a twine pocket and retainer spring on said baler adjacent said breast plate finger, said spring comprising a length of spring wire bent to resemble the letter alpha (α), one arm of said alpha constituting a yieldable twine pocket arm biased against the downstream side of said breast plate finger for confining baling twine on the downstream side of said breast plate finger to the region adjacent the axis of said bill hook, and the other arm of said alpha constituting a twine retainer arm blocking the free end of said cantilever breast plate finger to prevent premature movement of twine off of the upstream side of said breast plate finger.

2. A twine tying mechanism for a baler; a casing member, a slot in said casing member, said slot having an upstream section for passage of a twine needle and a downstream section for withdrawal of twine, a breast plate finger for supporting baling twine mounted on said baler and cantilevered over said slot intermediate said upstream and said downstream sections of slot, a tying mechanism including a bill hook on said baler for forming a knot in baling twine, said bill hook including a movable jaw for gripping twine, said bill hook also having an axis about which it rotates to move twine from the upstream side of said breast plate finger to the downstream side thereof and during which rotation twine wraps around said bill hook and said jaw grips twine, a twine pocket and retaining spring on said baler adjacent said breast plate finger, said spring including a flexible twine retaining arm biased toward said breast plate finger for confining twine on the upstream side of said breast plate finger until moved by said bill hook to said downstream side of said breast plate finger, said spring also including a flexible twine pocket arm biased toward said breast plate finger for confining twine near said axis of said bill hook after said bill hook has moved twine to said downstream side of said breast plate finger, said spring having an intermediate bight portion joining said pocket arm and said retaining arm, said spring being attached to said baler intermediate said pocket arm and said retaining arm.

3. A twine-tying mechanism for a baler as recited in claim 2, wherein said twine pocket and retaining spring comprises a length of spring wire formed to resemble the lower case Greek letter alpha (α), one arm of the "alpha" being said twine pocket arm and the other arm of the "alpha" being said twine retainer arm.

References Cited by the Examiner

UNITED STATES PATENTS

| 446,784 | 2/1891 | Lowry | 289—15 |
| 991,834 | 5/1911 | Dangel | 289—15 |
| 2,872,860 | 2/1959 | Smith et al. | 100—22 |
| 3,101,963 | 8/1963 | Sullivan et al. | 289—11 |

WALTER A. SCHEEL, *Primary Examiner.*

LOUIS O. MAASSEL, *Examiner.*